United States Patent
Firstenberg et al.

(10) Patent No.: US 10,802,681 B2
(45) Date of Patent: Oct. 13, 2020

(54) ACTIONABLE NOTIFICATIONS

(71) Applicant: Microsoft Corporation, Redmond, WA (US)

(72) Inventors: Yosef Firstenberg, Redmond, WA (US); Ihor Leshko, Redmond, WA (US); Joseph Anthony East, Redmond, WA (US); Larry Jin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 14/165,163

(22) Filed: Jan. 27, 2014

(65) Prior Publication Data
US 2015/0212674 A1    Jul. 30, 2015

(51) Int. Cl.
*G06F 3/0484*    (2013.01)
*H04W 4/21*    (2018.01)
(Continued)

(52) U.S. Cl.
CPC ............ *G06F 3/0484* (2013.01); *H04L 67/30* (2013.01); *H04L 67/36* (2013.01);
(Continued)

(58) Field of Classification Search
None
See application file for complete search history.

(56) References Cited

U.S. PATENT DOCUMENTS 8,244,822 B1    8/2012   Lowry et al.
8,275,672 B1 *  9/2012   Nguyen ............ G06Q 30/0635
                                                     705/26.1
(Continued)

FOREIGN PATENT DOCUMENTS

KR    20090000298 A    1/2009
WO    2006080632 A1    8/2006

OTHER PUBLICATIONS

"International Search Report and Written Opinion Issued in PCT Patent Application No. PCT/US2015/012112", dated Apr. 29, 2015, 9 Pages.
(Continued)

*Primary Examiner* — Toan H Vu
(74) *Attorney, Agent, or Firm* — Holzer Patel Drennan

(57) ABSTRACT

An actionable event notification disclosed herein provides actionable push notifications that allow an application server to collect information from end users. The actionable event notification includes a notification server that receives notification requests from application servers and communicates notifications to users where the notifications include specification for a notification UI form. In one implementation, the notification server modifies the callback identification on the notification from identification for the application server to identification for the notification server. A client device presents the notification UI form to a user to receive user responses. The user responses are communicated back to the notification server. The notification server processes the user responses and communicates them to the application server as necessary. Alternatively, the user responses are communicated directly to the application server requesting the notifications.

23 Claims, 10 Drawing Sheets

(51) Int. Cl.
  *H04L 29/08* (2006.01)
  *H04W 52/02* (2009.01)
  *H04M 1/725* (2006.01)
  *H04M 1/00* (2006.01)

(52) U.S. Cl.
  CPC ......... *H04M 1/72519* (2013.01); *H04W 4/21* (2018.02); *H04W 52/0264* (2013.01); *H04M 1/006* (2013.01); *H04M 1/7253* (2013.01); *Y02D 30/70* (2020.08)

(56) References Cited

U.S. PATENT DOCUMENTS

| | | | |
|---|---|---|---|
| 8,649,768 B1 | 2/2014 | Gaddam et al. | |
| 8,739,249 B1 | 5/2014 | Kay et al. | |
| 2002/0107922 A1* | 8/2002 | Nakamura | H04L 41/0253 709/205 |
| 2002/0161775 A1 | 10/2002 | Lasensky et al. | |
| 2003/0083944 A1* | 5/2003 | Duvall | G06F 8/20 705/21 |
| 2004/0158619 A1 | 8/2004 | Pedersen et al. | |
| 2005/0154759 A1 | 7/2005 | Hofmeister et al. | |
| 2008/0028326 A1* | 1/2008 | Wilson | G06F 9/4443 715/762 |
| 2008/0134211 A1 | 6/2008 | Cui | |
| 2010/0058255 A1* | 3/2010 | Stefanik | H04L 67/36 715/866 |
| 2010/0250416 A1* | 9/2010 | Hazlehurst | G06Q 20/00 705/34 |
| 2010/0333072 A1* | 12/2010 | Dulip | G06F 11/3419 717/128 |
| 2011/0047620 A1* | 2/2011 | Mahaffey | G06F 21/564 726/23 |
| 2011/0219429 A1* | 9/2011 | Lee | H04L 67/303 726/3 |
| 2011/0252336 A1* | 10/2011 | Ishii | G06F 19/322 715/745 |
| 2011/0289172 A1* | 11/2011 | Marcellino | H04L 51/24 709/206 |
| 2012/0173610 A1 | 7/2012 | Bleau et al. | |
| 2012/0204191 A1* | 8/2012 | Shia | G06Q 10/10 719/318 |
| 2012/0216130 A1* | 8/2012 | Porro | G06Q 10/00 715/753 |
| 2012/0239507 A1 | 9/2012 | Braginsky | |
| 2012/0239741 A1* | 9/2012 | Fujiwara | G06Q 50/01 709/204 |
| 2012/0304116 A1 | 11/2012 | Donahue et al. | |
| 2012/0307656 A1* | 12/2012 | Vyrros | H04L 12/1859 370/252 |
| 2013/0111326 A1 | 5/2013 | Lockhart et al. | |
| 2013/0297333 A1* | 11/2013 | Timmons | G06F 19/3456 705/2 |
| 2013/0304616 A1 | 11/2013 | Raleigh et al. | |
| 2013/0316746 A1 | 11/2013 | Miller et al. | |
| 2013/0332856 A1 | 12/2013 | Sanders et al. | |
| 2013/0346511 A1 | 12/2013 | Park et al. | |
| 2014/0053189 A1* | 2/2014 | Lee | H04N 21/4858 725/37 |
| 2014/0101550 A1* | 4/2014 | Zises | G06F 3/01 715/721 |
| 2014/0108504 A1* | 4/2014 | Hirosawa | H04L 67/42 709/203 |
| 2014/0150007 A1 | 5/2014 | Randall et al. | |
| 2014/0258378 A1* | 9/2014 | Cobb | H04L 67/10 709/203 |
| 2014/0259060 A1* | 9/2014 | Choi | H04N 21/482 725/37 |
| 2014/0274136 A1* | 9/2014 | Edge | H04W 4/04 455/456.2 |
| 2014/0282257 A1* | 9/2014 | Nixon | G05B 11/01 715/835 |
| 2014/0304714 A1* | 10/2014 | Shapiro | G06F 9/542 719/318 |
| 2014/0325025 A1* | 10/2014 | Yeleswarapu | H04L 63/02 709/219 |
| 2014/0327547 A1 | 11/2014 | Johnson et al. | |
| 2014/0359476 A1* | 12/2014 | Wakeford | H04L 67/26 715/748 |
| 2014/0379920 A1* | 12/2014 | Nathwani | H04W 4/04 709/226 |
| 2015/0020012 A1* | 1/2015 | Wang | G06F 3/04886 715/768 |
| 2015/0089673 A1 | 3/2015 | Beckman et al. | |
| 2015/0120849 A1* | 4/2015 | Thies | H04W 72/0493 709/206 |
| 2015/0188858 A1* | 7/2015 | Nagata | G06F 17/30864 715/758 |
| 2015/0206225 A1* | 7/2015 | Stoll | G06Q 30/0631 705/26.7 |
| 2015/0212675 A1 | 7/2015 | Firstenberg et al. | |
| 2016/0321121 A1 | 11/2016 | Sharma et al. | |
| 2017/0295258 A1* | 10/2017 | Raleigh | H04L 67/20 |
| 2017/0323354 A1* | 11/2017 | Martell | G06Q 30/0279 |
| 2020/0019289 A1 | 1/2020 | Firstenberg et al. | |

OTHER PUBLICATIONS

International Searching Authority, International Preliminary Examining Authority, Written Opinion for PCT/US2015/012112, dated Dec. 11, 2015, 6 pages.

"Configuring Safari Push Notifications" Retrieved on: Dec. 21, 2016, Available at: https://developer.apple.com/library/content/documentation/NetworkingInternet/Conceptual/NotificationProgrammingGuideForWebsites/PushNotifications/PushNotifications.html.

"Local and Push Notification Programming Guide: Apple Push Notification Service" Retrieved on: Dec. 21, 2016, Available at: Apple OSX 10.9 SDK /com.apple.adc.documentation.AppleOSX10.9.CoreReference.dooset/Contents/Resources/Documents/documentation/NetworkingInternet/Conceptual/RemoteNotificationsPG/Chapters/ApplePushService.html.

"UNNotificationCategory" Retrieved on: Dec. 21, 2016, Available at: https://developer.apple.com/reference/usernotifications/unnotificationcategory.

"API & Callback URL", Retrieved on: Oct. 8, 2013, Available at: http://www.zoho.com/campaigns/help/settings/api-callback-url.html.

Qu, et al., "Cloud Service Selection Based on the Aggregation of User Feedback and Quantitative Performance Assessment?" In Proceedings of the IEEE International Conference on Services Computing, Jun. 27, 2013, 8 pages.

Karasiewicz, Christian, "Push Notifications: Love it or Hate it?", Retrieved on: Oct. 8, 2013, Available at: https://www.ibm.com/developerworks/community/blogs/mobileblog/entry/push_notifications_love_it_or_hate_it3?lang=en.

"Final Office Action Issued in U.S. Appl. No. 14/165,278", dated Dec. 20, 2017, 15 Pages.

"Final Office Action Issued in U.S. Appl. No. 14/165,278", dated Jun. 16, 2016, 14 Pages.

"Non Final Office Action Issued in U.S. Appl. No. 14/165,278", dated Jan. 29, 2016, 14 Pages.

"Non Final Office Action Issued in U.S. Appl. No. 14/165,278", dated Jun. 7, 2017, 16 Pages.

"Non Final Office Action Issued in U.S. Appl. No. 14/165,278", dated Nov. 4, 2016, 14 Pages.

"Non Final Office Action Issued in U.S. Appl. No. 14/165,278", dated Jun. 14, 2018, 22 Pages.

"International Preliminary Report on Patentability Issued in PCT Application No. PCT/US2015/012112", dated Mar. 18, 2016, 6 Pages.

"Notice of Allowance Issued in U.S. Appl. No. 14/165,278", dated Jul. 1, 2019, 13 Pages.

"First office action and Search Report Issued in Chinese Patent Application No. 201580006062.6", dated Feb. 2, 2019, 11 Pages.

(56) References Cited

OTHER PUBLICATIONS

Final Office Action Issued in U.S. Appl. No. 14/165,278, dated Feb. 25, 2019, 18 Pages.
"Office Action Issued in Chinese Patent Application No. 201580006062. 6", dated Sep. 5, 2019, 7 Pages.
"Notice of Allowance and Search Report Issued in Chinese Patent Application No. 201580006062.6", dated, May 8, 2020, 6 Pages.

\* cited by examiner

ACTIONABLE NOTIFICATIONS

CROSS-REFERENCE TO RELATED APPLICATIONS

The present application is related by subject matter to U.S. patent application Ser. No. 14/165,278, filed concurrently herewith and entitled "Processing Actionable Notifications," now U.S. Pat. No. 10,540,063, issued Jan. 21, 2020, which is specifically incorporated by reference herein for all that it discloses and teaches.

BACKGROUND

Modern communication technology and the growth of the Internet and wireless networks allow provision of various services to end users through a wide variety of devices, such as computers, personal data assistants, cell phones, smart phones, tablets, etc. Examples of services available through such devices include social network applications, gaming applications, traveling services, email, calendar services, etc. For example, a user can connect to a social network, review news, receive travel updates, and receive emails, etc., using such applications. The applications can also allow the users to receive updates about one or more news events, calendar updates, and new postings on a social media network, etc. Such applications provide a rich user experience via computing systems, such as mobile devices. Generally, application servers are used to provide backend services associated with the application to the client computing systems. For example, an application server that hosts a social network application may serve social network information to a social network client application running on a mobile device.

Mobile devices face limitations relating to battery usage, network costs, etc. Therefore, many mobile platforms attempt to reduce battery use by minimizing the number of applications using the CPU and other resources of the mobile device. Furthermore, to reduce the consumption of battery and to reduce the network costs, mobile platforms may also minimize the amount of time for which a mobile device communicates with and remains connected to services on the network.

SUMMARY

An actionable event notification disclosed herein provides actionable notifications that allow an application service to collect information from end users. The actionable event notification includes a notification server providing a notification service that receives notification requests from application servers providing application services and communicates notifications to users where the notifications include a specification defining a notification UI form to be presented via a user interface of a target device. The target device presents the notification UI form to a user to receive user responses. The user responses are communicated back to the notification service. The notification service processes the user responses and communicates them to the application service as necessary and/or processes them at the notification service (e.g., redirecting them to another application server or other destination). Alternatively, the user responses are communicated directly from the client devices to the application service requesting the notification. In one implementation, the notification service modifies the callback identification provided in the notification request received from the application service, replacing it with identification for the notification service.

In some implementations, articles of manufacture are provided as computer program products. An article of manufacture may comprise a tangible storage medium to store logic. One implementation of a computer program product provides a tangible processor-readable storage medium encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
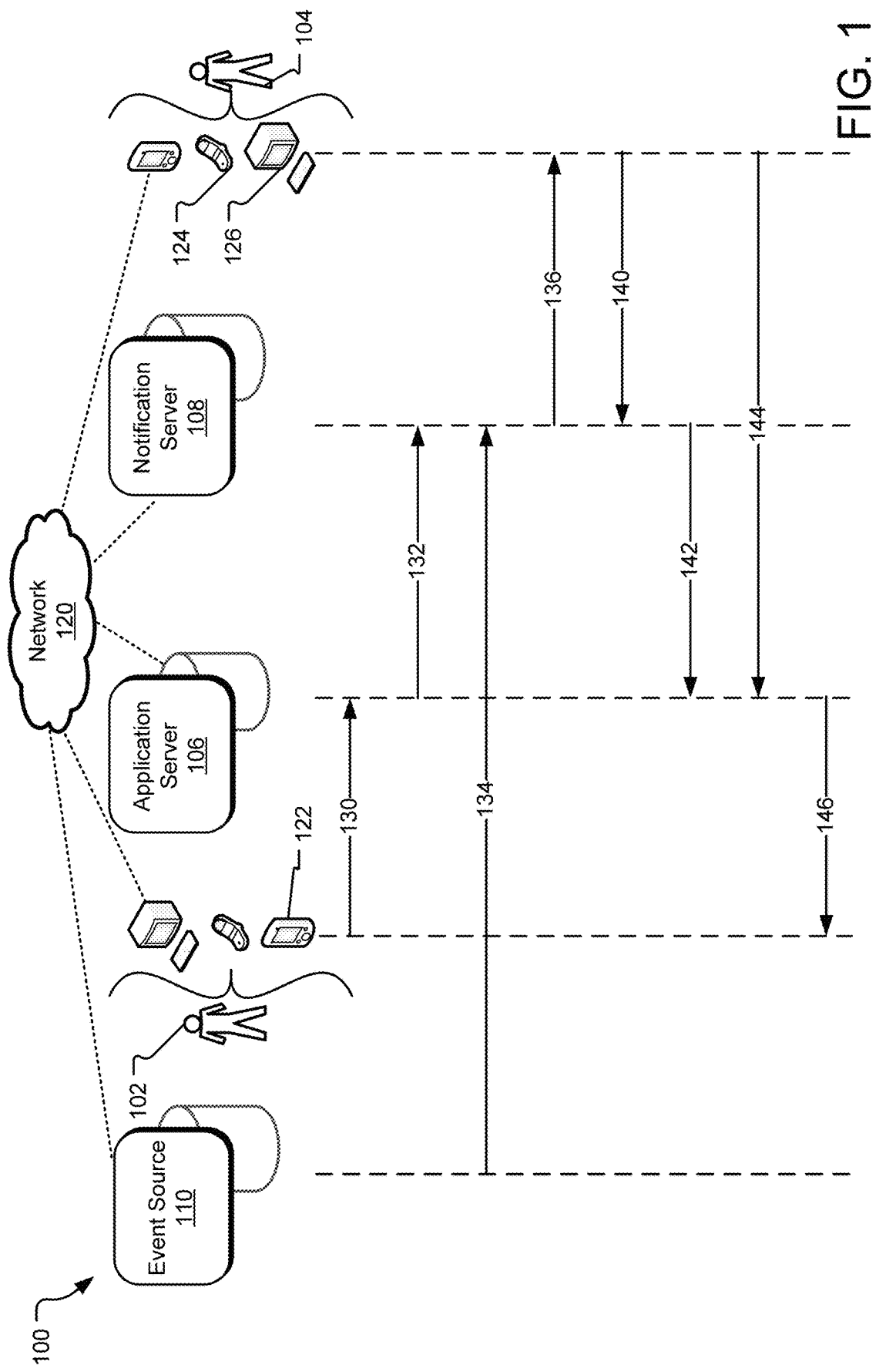
FIG. 1 illustrates example data sources and flows for an actionable event notification disclosed herein.

To deliver information to applications running on client devices, application servers can use notification servers that send push notifications to the client devices. For example, in a scenario of an application server for a news application that sends breaking news alerts to a mobile device, the news application server posts an event notification request to a notification server. The notification server may already have a communication connection open to the mobile device or it may open a communication connection in response to the event notification request received from the application server. The notification server delivers a notification to the mobile device using the communication connection. The operating system of the mobile device processes the notification and presents a visual, audio, or audio-visual notice to the device user via a user interface of the mobile device. Alternatively, the mobile device may simply deliver the notification to the mobile application for further processing. It should be understood that the client device (e.g., the target device) may be a mobile or non-mobile device (e.g., a set top box, a gaming console, a desktop computer, etc.).

In various implementations, an actionable event notification disclosed herein facilitates efficient bi-directional communication between client devices and backend application servers providing services for various applications running on the client devices. For example, the actionable event notification may facilitate efficient bi-directional communication between an application server that hosts a social network application and a client device, such as a smartphone, that runs a social networking application. In one implementation, an application server may use the actionable event notification disclosed herein to get feedback from a client device without executing the client application on the client device. For example, the actionable event notification may send a notification user interface (UI) form specification to the mobile device and an operating system of the mobile device may present a notification UI form defined by the specification to the user without invoking or communicating with any mobile application.

Certain notifications, also referred to as "toasts," where the notification results in a graphical display that pops up over part of a graphical user interface display at the client device are useful to alert end users in a simple, immediate manner that does not overly disrupt ongoing use of the client device by the end user. In various examples described herein, such notification systems at notification servers and client devices are extended and enhanced to enable information from the client device to be communicated to the notification server and/or application server. An actionable notification system enables computing and communications workloads to be moved away from the client device onto other entities such as the notification server and/or application server. In some examples, an operating system at the client device (such as a mobile phone, desktop computer, or gaming console) is modified and/or a notification UI forms processing module is provided at the client device. The actionable notification system results in a better client device that uses its resources more efficiently and/or is easier to write application software for, from the point of view of the application server provider. Usability is also improved for the end user of the client device. For example, by using the UI form specification it is possible to ensure the "look and feel" and/or style of the actionable notifications are appropriate for the particular application service the actionable notifications are associated with. Actionable notification systems also make the actionable notifications more usable for the end user. In addition, by using the actionable notifications the end user has fast, immediate control of application services. When communicating between a software application at the client device and an application server, a web connection, such as a web socket, may be used. Such a communication channel can time to establish, whereas using an actionable notification service, the notification channel is already established and available between the notification service and the client device.

An implementation of the actionable event notification provides a notification UI form specification to the mobile device user to collect information from the user. For example, in response to a notification request from a news application server, the actionable event notification presents a notification UI form via the user interface of the mobile device to collect input from the user, wherein the notification UI form prompts the user to indicate whether the user is interested in finding out more about a news story. That is, a notification UI form can be any combination of textual, visual, or audible and/or graphical elements prompting a user to enter information in an expected manner, such as by tapping an area of a touch screen, providing textual or voice input, capturing a video or still image, etc. An event notification server providing the event notification service may include or have access to a database of notification UI form specifications for various application servers and various client devices. In such an implementation, when the actionable event notification receives a notification request from the application server, the event notification server selects a notification UI form specification from the database of notification UI form specifications, communicates the notification UI form specification to the mobile device, and requests the mobile device operating system to present the notification UI form to the user without invoking a mobile application. In an alternative implementation, the actionable event notification may request the mobile device operating system to analyze the information provided by the user via the notification UI form specification and determine whether to invoke a mobile application in response to the analysis of the user provided information.

FIG. 1 illustrates example data sources and flows for an actionable event notification 100 disclosed herein. The actionable event notification 100 facilitates communication across a network 120 between and/or among various users 102 and 104 and various application servers, such as an application server 106, using a notification server 108. In one example, the application server 106 represents a voice over IP (VOIP) server that provides VOIP and instant messaging (IM) services (example "application services") to users using various types of devices, such as mobile phones, smartphones, laptop computers, desktop computers, etc. An external event source 110, such as a news or RSS feed (alternative "application services"), may also communicate with the notification server 108 using the network 120, such as the Internet, to provide notifications to equipment of end users 102 and 104.

The users 102 and 104 may connect with the application server 106, the notification server 108, and each other using the network 120. For example, the user 102 has a VOIP application installed on his or her smartphone 122 that can be used to communicate with the user 104. To initiate communication with user 104, the user 102 sends a notification request 130 to the application server 106. The application server 106 processes the request to determine a target device to which it needs to send a notification. The application server 106 may have a memory that stores the mapping of various devices to users. Thus, the application server 106 may use the mapping to identify a target mobile device 124. In the present case, if the user 102 has requested a connection with the user 104, the application server 106 determines that it needs to send a notification to the target mobile device 124 (e.g., to notify the mobile device 124 of the incoming message).

To conserve battery power, the operating system of the mobile device 124 generally attempts to reduce the number of client applications executing on the mobile device 124 at any time. For example, in one implementation, all of the applications that are not currently in use by the user 104 may be terminated or suspended in order to conserve battery power. Thus, the VOIP or IM applications on the mobile device 124 may not be running when the request is sent from the user 102. Furthermore, to conserve the communication bandwidth used by the mobile device 124, the mobile device 124 may not have any open communication connections with the application server 106. Therefore, to send a notification to the device 124, the application server 106 sends a notification request 132 to the notification server 108. Another example of a notification request to the notification server 108 includes an event notification 134 from the event source 110, such as a news feed, that needs to send a news update to the user 104.

The notification request 132 may include, for example, event-identifying content (e.g., a brief subset of the message, news item, etc.), a callback specification, a user identification, a device identification, etc. Both a user identification and a device identification can be considered a notification target identification, representing the target destination(s) that the application server is attempting to notify of the event. For example, for the application server 106 that provides a social networking service, the notification request 132 may include an identification of a client device used to view the social networking updates, an update on the social networking page (such as a newly posted comment), and the specification of the expected callback from the user (such as a comment response), a like/dislike input, etc. Furthermore, the callback specification may also specify the social networking server 106 as the destination for any response from the user. In one implementation, the callback specification is provided in the form of a uniform resource identifier (URI), a uniform resource locator (URL), etc.

The notification server 108 can modify the callback specification to identify the notification server 108 instead of the application server 106. In this manner, the notification server 108 can manage any response from the mobile device 124. The notification server 108 can perform appropriate operations in reaction to a received response, including forwarding the response back to the application server 106 identified in the original callback specification.

In one implementation, the notification request 132 from the application server 106 also includes a notification UI form specification defining a notification UI form to be presented to the user 104. Alternatively, the notification server 106 may determine an appropriate notification UI specification to association with the notification. In yet another alternative, the notification request 132 may include a request to invoke (e.g., initiate execution, bring to the foreground) an appropriate application on the client device 124. For example, in the case of the application server 106 being a VOIP application server, the notification request 132 may specify invoking a VOIP application on the device 124.

Upon receiving a notification request 132, the notification server 108 determines the source of the notification request 132, the event-identifying content of the notification request 132, and a target device. For example, the notification request 132 from a VOIP application server specifies a mobile device (e.g., a phone number) that is the intended destination for a notification. Alternatively, the notification request 132 may only specify a user or group of users as a less-specific destination for the notification (e.g., a user), in which case, the notification server 108 determines one or more target devices associated with the user or group of users.

The notification server 108 may include a redirection module that determines the destination for the notification 136 and sends a notification 136 to such device. Furthermore, the notification server 108 also includes a database of notification UI form specifications that the notification server 108 associates with the notification 136. For example, upon receiving a VOIP notification request 132, the notification server 108 selects a notification UI form specification that defines a notification UI form that requests the user 104 to specify whether the user 104 is interested in taking a VOIP call on the mobile device 124 and associates the selected notification UI form specification with the notification 136. The associated notification UI form specification can be sent with or otherwise is associated with the notification 136 to the mobile device 124.

Alternatively, the notification UI form may request the user 104 to specify an alternative device where the user 104 would like to receive the VOIP call. For example, if the user 104 has the capability to receive the VOIP call using the mobile device 124 and a computer 126, the notification UI form may present two selection buttons from which the user 104 can select a desired target device.

The mobile device 124 may present the notification UI form to the user 104 using the operating system of the mobile device 124 and without invoking the VOIP application on the mobile device 124. For example, the notification UI form may collect input from the user, such as "ignore this call" and then send the user's "ignore" response back to the notification server 108 without invoking the VOIP application on the mobile device 124. In some other examples, the mobile device 124 presents the notification UI form using the operating system of the device 124 and may also invoke the VOIP application, whether concurrently or subsequently to processing of the notification UI form by the operating system. For example, the installed VOIP application may be fully invoked in the foreground or invoked in the background to allow the operating system and/or notification UI form to extract information from the installed application. In yet another alternative implementation, the VOIP application is invoked only after receiving one or more inputs from the user 104 through the notification UI form in the user interface of the mobile device 124. Furthermore, the mobile device 124 may also revise the notification UI form presented to the user 104 based on various parameters about the user 104, such as the user's preferences, location, etc.

The mobile device 124 collects the information provided by the user 104 through the notification UI form presented in the user interface of the mobile device 124 and sends a UI response 140 to the notification server 108. These collecting and sending operations may be performed by the operating system of the mobile device 124 (or other target device). Thus, for example, in the case of a VOIP notification, the mobile device 124 collects the information provided by the user 104 via the notification UI form as to whether the user 104 wants to accept the VOIP call, etc., and sends the information as a UI response 140 to the notification server 108. The notification server 108 processes the UI response 140 and generates a notification response 142 to the application server 106. For example, if the user 104 has indicated a desire to receive the VOIP call at a specific later time, the notification server 108 generates the notification response 142 including the specified time to the application server 106.

Alternatively, after processing the notification UI form, the mobile device 124 may determine to activate an application on the mobile device 124. Thus, in response to the notification UI form related to the VOIP request, the mobile device 124 may activate the VOIP application. Subsequently, the VOIP application on the client device directly sends an application response 144 to the application server 106. For example, the application response 144 may include acceptance of the VOIP call from the user 104. The application server 106 processes the notification response 142 and/or the application response 144 and generates a user response 146 to the user 102.

Thus, the actionable event notification 100 facilitates communication between various users, application servers, event sources, etc., with efficient utilization of the existing and ongoing communication connection between the mobile device 124 and the notification server 108 (that is available as a result of the push notification service being provided to the mobile device by the notification server). No new communication channel between the application server 106 and the mobile device 124 need be established. Furthermore, as the mobile device 124 does not have to invoke the applications on the device to collect information from the user 104, the actionable event notification 100 conserves the battery power on the client device 124. Usability is also improved for the end user of the mobile device 124.

It should be understood that each application service and each notification service may be managed by multiple, distributed application servers and notification servers with a variety of optimizations including load balancing, optimized routing, and resource management. An application server or a notification server may take the form of a single server system or multiple distributed server systems.

Figure 2:
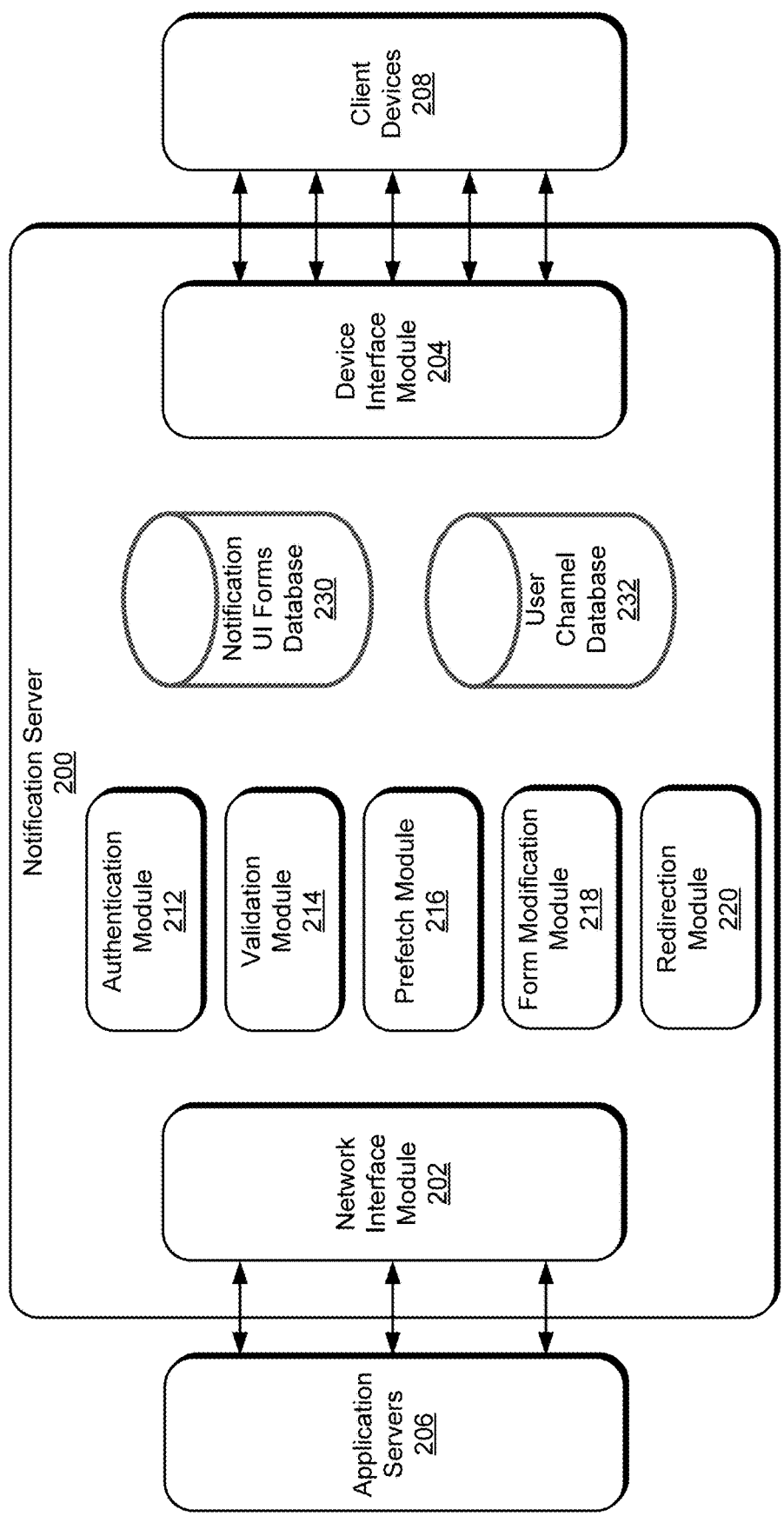
FIG. 2 illustrates example an example architecture for a notification server for the actionable event notification disclosed herein.

FIG. 2 illustrates an example architecture for a notification server 200 for the actionable event notification disclosed herein. The notification server 200 includes a network interface module 202 that is configured to communicatively connect to various application servers 206 and a device interface module 204 that is configured to communicate with various client devices 208. It should be understood that the interface modules 202 and 204 may be integrated and may interface with a single network or with different networks. The notification server 200 may be implemented on an application server or on a dedicated server with high-speed communication connections to networks, such as the Internet. In one implementation, the notification server 200 has at least one existing and ongoing communication connection with each of the client devices 208. The notification server 200 is configured to send push notifications to the devices 208 via existing and ongoing communication connections (such as TCP channels). The application servers 206 may communicate with the notification server 200 using a high-speed, high-capacity binary asynchronous interface, etc. For example, in one implementation, the application servers 206 communicate with the notification server 200 using an HTTP POST request over a secure sockets layer (SSL). In some implementations, such communication channels may be bi-directional. For example, the notification server 200 may post to an application server 206 certain user feedback collected via a notification UI form on a client device 208.

It should be understood that the notification UI form may also provide an amount of rich user interface activity. For example, an application server can specify that notification UI form provide an alert that interrupts the user through the user interface and allows the user to pin the alert to a particular user interface tile, add some information from the alert's payload to the user's calendar, etc. Other actions may be made available through the notification UI form presented through the user interface of the client device.

An implementation of the notification server 200 also includes an authentication module 212 to authenticate notification requests received from the applications servers 206 and a validation module 214 to validate such notification requests. For example, the authentication module 212 authenticates the source of the notification request to ensure that only legitimate notification requests are processed by the notification server 200. In another implementation, the validation module 214 validates the payload or content included in the notification request. Example content included in a notification request may be a message to a target user, an identification of the target user, a notification UI form specification to be sent to the target device, etc. Accordingly the validation module 214 can validate the content of the notification request to ensure that the request does not include any malicious code, virus, etc.

The notification server 200 also includes a prefetch module 216 that prefetches information used to service the notification request. For example, after analyzing the notification request, the prefetch module 216 fetches a notification UI form specification from a notification UI form database 230. Notification UI form specifications define a notification UI form that can be presented via a user interface at a target device. The prefetch module 216 may use the source, destination, and/or content of the notification request, among other parameters, to determine the notification UI form specification to be used to service the notification request. In one implementation, an application server 206 may have provided a specific notification UI form specification to be used to service a specific type of notification request. Thus, the notification UI forms database 230 can store such notification UI form specifications by source of notification requests, the destination for the notification UI form specifications, the type and/or content of notification requests, etc. For example, if the notification request is from a VOIP application server for a VOIP message request, a VOIP-based notification UI form specification is used. On the other hand, a different notification UI form specification is used for a notification request from an IM server for an IM message. In yet another implementation, a first VOIP server may employ a notification UI form that collects information regarding a recipient's willingness to take a VOIP call, whereas another VOIP server may employ a notification UI form that also collects information about the recipient's preferred device on which to take the call.

In another implementation of the prefetch module 216, UI components of a notification UI form, such as images, audio, icons, etc. may be collected and prepared (e.g., formatted for a particular display of a target device). The UI components may be combined with the notification UI form selected by the prefetch module 216 at the notification server 216. Alternatively, certain UI components may be sent to the target device separately from the notification UI form, wherein the target device (e.g., the operating system on the target device) combines the UI components with the received notification UI form before presentation of the notification form to the user on the target device.

The notification server 200 may also include a user channel database 232 that stores information regarding communication connections related to various users. In one implementation, the channel information is categorized by the client devices (e.g., as identified by a device identification). Alternatively the channel information is categorized by user identification or another channel-influencing factor. For example, the user channel database 232 includes information about channels related to each VOIP identification associated with a specific device, each VOIP identification associated with a specific user, etc.

A form modification module 218 can modify the notification UI form specification as necessary based on the content from the notification request, the identification of the request source and/or target device, or other parameters. Example modification may include without limitation changing the notification UI form to support a particular type of target device (e.g., mobile phone versus game console versus portable computer), simplifying the format of a received notification UI form from a rich format to a less-rich format compatible with a target device with less sophisticated display capabilities (e.g., simplifying an rich graphical notification UI form to a text-only UI form for a low end mobile phone with limited display capabilities). The form modification module 218 associates the modified UI form specification with an outgoing notification to one of the client devices 208. A redirection module 220 redirects the notification together with the appropriate notification UI form specification to one of the client devices 208.

Figure 3:
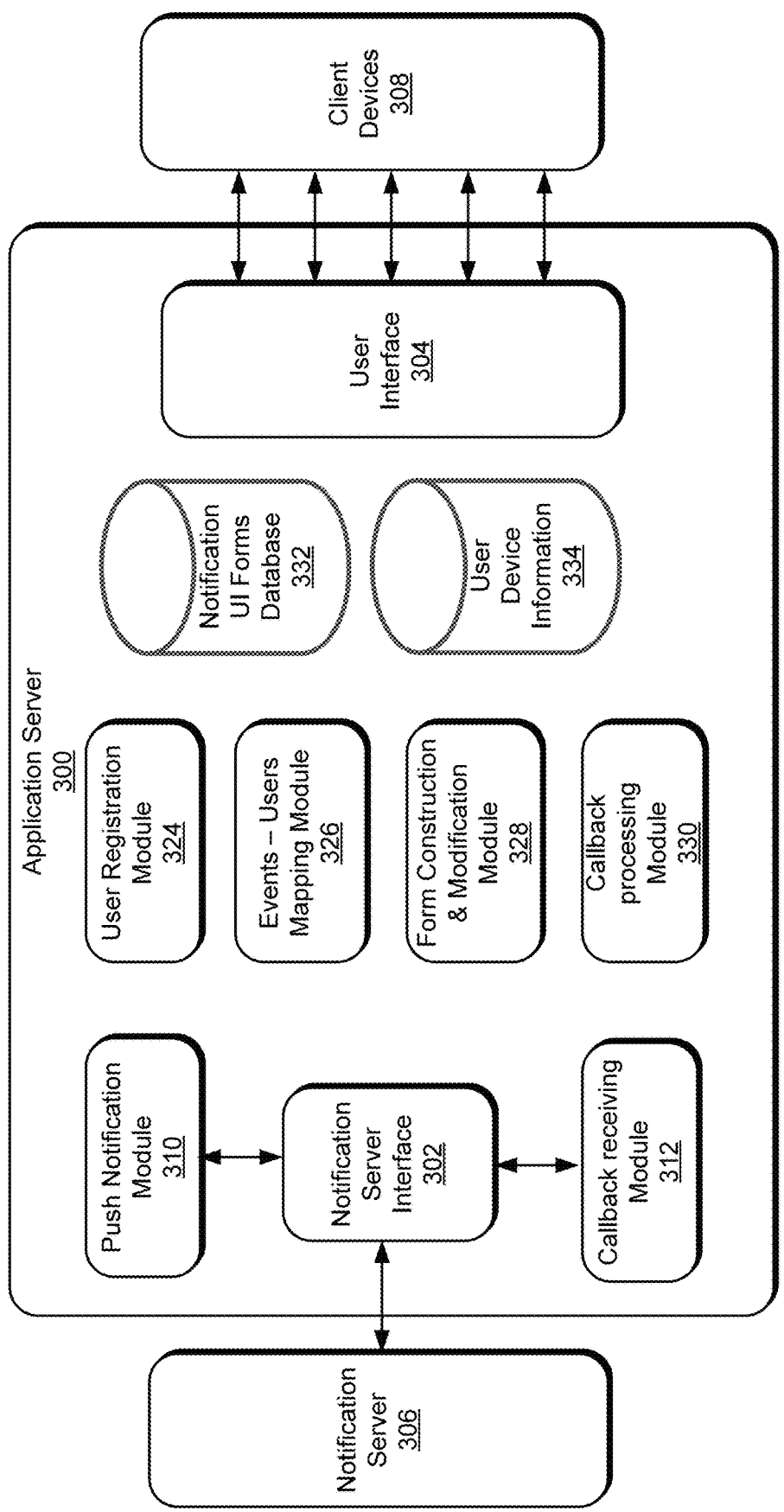
FIG. 3 illustrates example an example architecture for an application server for the actionable event notification disclosed herein.

FIG. 3 illustrates an example architecture for an application server 300 for the actionable event notification disclosed herein. The application server 300 includes a notification server interface 302 to communicate with a notification server 306 and a user interface 304 to communicate with various client devices 308. A push notification module 310 generates push notification requests to be sent from the application server 300 to the notification server 306. For example, if a client device 308 requests an IM connection to another device via the application server 300 providing IM service, the push notification module 310 generates a notification request for sending a notification to the other device. In such a case, the notification server interface 302 communicates the notification request to the notification server 306 to send an IM request to the target device. The push notification module 310 may also generate callback URLs that are included with the notification requests sent by the application server 300 to the notification server 306. Such callback URLs may specify that client device responses to the notification may be sent back to the application server 300 or to some other destination. In some implementations, the notification server 306 may modify the callback URL so that the client device sends responses back to the notification server 306, rather than the original callback URL specified by the application server 300.

The application server 300 also includes a user registration module 324 that registers users' devices 308 on the application server 300. The user registration may include, for example, user account information, user identifications, passwords, etc. Thus, for the application server 300 providing IM services, the user registration module 324 may include the information about the identification of client devices related to the user, such as the phone numbers for the mobile devices, computer identification, email address, etc. An events-users mapping module 326 stores mapping of events to various users. For the application server 300 providing news services, the events-users mapping module 326 stores information about which news events shall be provided to a particular user, etc. For example, a first user may be interested in getting updates related to sports events, whereas a second user may be interested in getting updates related to political events, etc. In such a case, the events-users mapping module 326 maps the source of sports events updates to the first user and the sources of political event updates to the second user. Similarly, for the application server 300 providing VOIP services, the events-users mapping module 326 maps a VOIP request from a calling user to a target user.

Other examples of user responses collected by the notification UI form and processed by the notification server 306 or application server 300 may include without limitation whether the user accepts or declines a VOIP call, whether the user "likes" the received content, a response message to be posted back to the social media network, etc.

A form construction and modification module 328 constructs and/or modifies notification UI form specifications defining a notification UI form used to communicate an event to a user via the user interface of one of the client devices 308. For example, for an event related to a VOIP request, the form construction and modification module 328 constructs or modifies a notification UI form specification defining a notification UI form that requests a target user to specify his or her willingness to take a VOIP call. The form construction and modification module 328 may use notification UI form specifications stored in a notification UI forms database 332 and modify such UI form specifications as appropriate. The application server 300 also includes a client device information database 334 that includes information about the client devices 308, such as the make and model of a client device, etc. The form construction and modification module 328 may also use the information from the client device information database 334 to modify a notification UI form specification selected from the notification UI forms database 332. For example, if a notification UI form specification is constructed for presentation on a device with a Flash player capability and a client device does not have a Flash player capability, the form construction and modification module 328 can modify such notification UI form specification accordingly.

The application server 300 also includes a callback receiving module 312 that is configured to receive callbacks received from the notification server 306 or client devices 308. The callback receiving module 312 communicates the received callbacks to a callback processing module 330 that processes the callbacks from the notification server 306. Processing the callbacks may involve, for example, processing the information provided by a user in response to a notification UI form presented to the user, constructing a response message, opening another communication, etc. For example, for an application server 300 providing VOIP services, if the callback from the notification server 306 specifies that a user wants to receive a VOIP call at an alternative device, the callback processing module 330 can generate a VOIP request to be sent to the alternative device.

Figure 4:
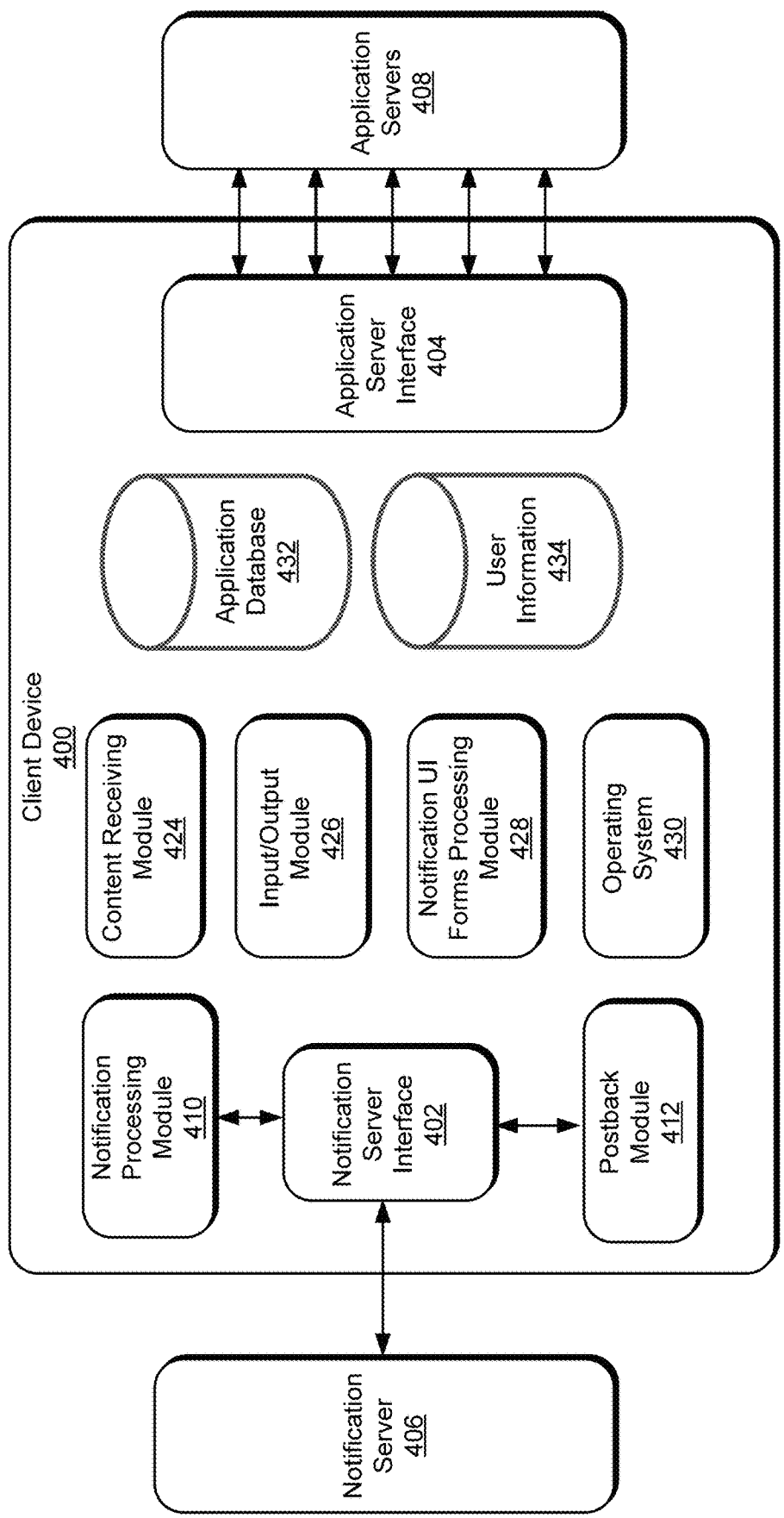
FIG. 4 illustrates example an example architecture for a client device for the actionable event notification disclosed herein.

FIG. 4 illustrates an example architecture for a client device 400 for the actionable event notification disclosed herein. The client device 400 may be, for example, a mobile phone, a laptop, a gaming console, a set-top box, a smartphone, etc. The client device 400 includes a notification server interface 402 that communicates with a notification server 406 and an application server interface that communicates with various application servers 408. The notification server interface 402 may receive push notifications from the notification server 406 wherein the push notifications may include a notification UI form specification defining a notification UI form to be presented to a user. A notification processing module 410 processes the information received in the notification. For example, the notification processing module 410 may analyze a notification to determine the destination module on the client device 400 to receive content from the notification. Thus, if the notification requests invoking an application on the client device 400, the notification processing module 410 invokes an application from an application database 432. The application database 432 may include executable files for various applications that are configured to execute on the client device 400. In some implementations, the postback module 412 may prepare the response to the appropriate server, such as by packing local data, compressing the local data, and/or signing it before returning it to the server.

In various examples, the operating system 430 of the client device is enhanced to enable actionable notifications. If the notification instructs the client device 400 to present a notification UI form to a user without invoking an application, the operating system 430 processes the notification by presenting the notification UI form defined by the notification UI form specification received in association with the notification. For a notification including or associated with a notification UI form specification, the operating system 430 uses a notification UI forms processing module 428 to process the notification UI form specification and to present the notification UI form to the user. An input/output module 426 presents the notification UI form on the client device 400 using device output resources, such as a touch screen, and received input from the user using an input such as a keyboard. A content receiving module 424 receives content from a user information database 434 for use by the input/output module 426. Thus, the notification UI form presented to the user may be populated by various default or other user information stored on the user information database 424.

The notification UI forms processing module 428 collects the information provided by a user in response to the notification UI form and determines whether to invoke an application from the application database 432 or to return a postback notification to the notification server 406. Example user input is not limited to keyboard input but may also include without limitation voice responses, still or video image data captured by a mobile camera or other input devices, etc. A postback module 412 generates the postback notification that is communicated through the notification server interface 402 to the notification server 406.

In various implementations, any one or more of: the content receiving module 424, the input/output module 426 and the notification UI forms processing module 428 may be integral, in whole or in part, with the operating system 430.

In an example, a mobile communications device or other target device comprises an operating system arranged to receive a notification message from a notification server with which the device is in substantially continual communication; the operating system arranged to parse a notification UI form specification from the received notification message, to use the UI form specification to display a UI form at a display of the mobile communications device, to receive user input in response to the displayed UI form, and to communicate with any of the notification server and an application server on the basis of the received user input.

Figure 5:
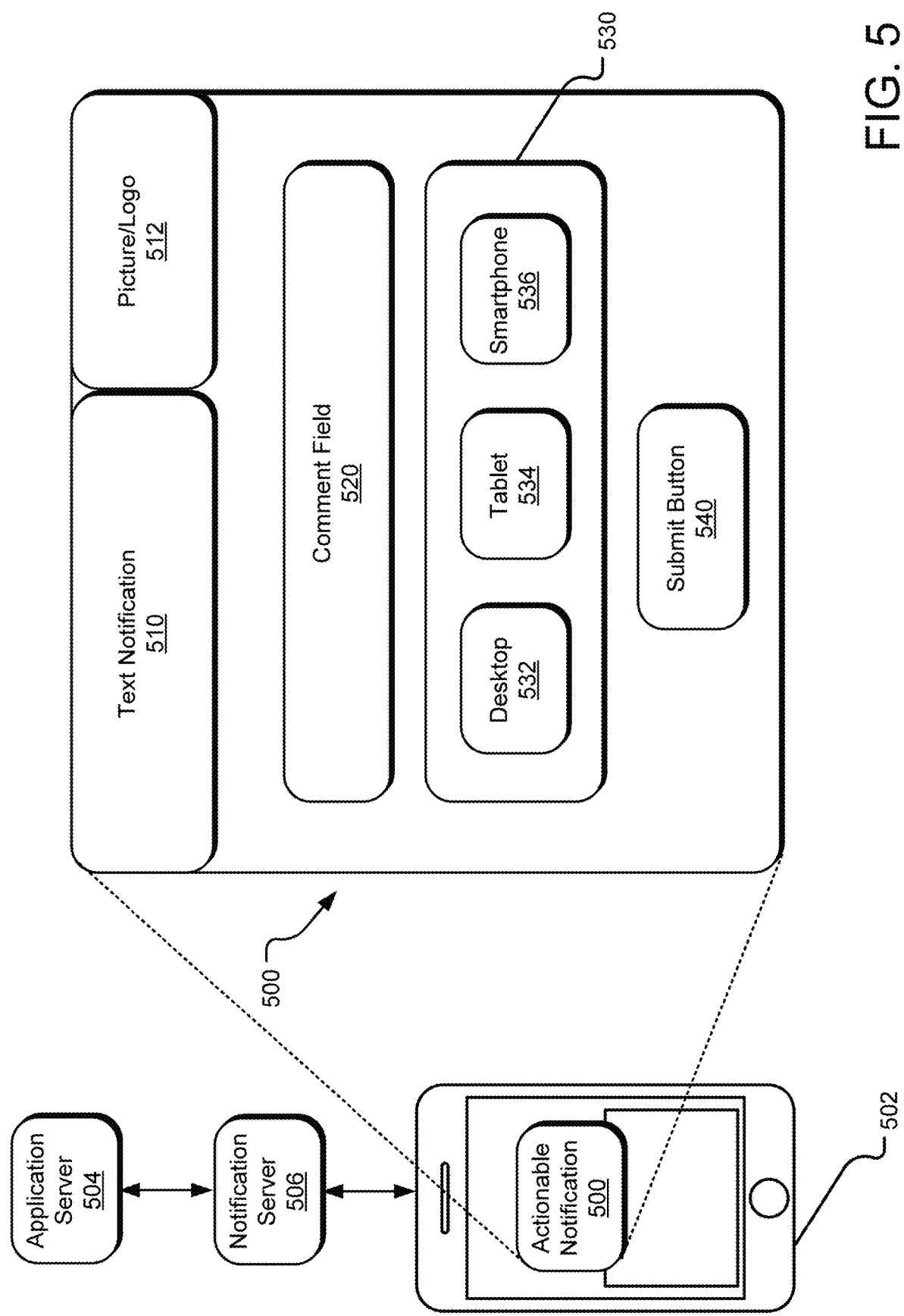
FIG. 5 illustrates an example actionable notification provided on a client device.

FIG. 5 illustrates an example actionable notification as presented in a notification UI form 500 provided on a client device 502 in response to a notification. The notification UI form 500 may be provided to the user in response to a notification request from an application server 504 to a notification server 506. The notification UI form 500 is processed and presented by the operating system of the client device 502 and may include a text notification 510 including the content of the notification that is displayed on the client device 502. As an example, the illustrated notification UI form 500 also includes a picture/logo 512 that may identify the application server that initiates the notification.

In one implementation, the application server 504 may be a VOIP service that sends a notification to the user about a request for a VOIP session. In this case, the text notification 510 notifies the user that another user has requested a VOIP session with the user of the device 502. The text notification 510 may include information about the user requesting the VOIP session and other information identifying the VOIP session. The picture/logo 512 may identify the VOIP application server. The notification UI form 500 also includes a comment field 520 that can be used by a user to input his or her comments. Other example UI components may include video and/or audio clips, voice messages, still images, avatars, icon, etc.

An input field 530 of the notification UI form 500 provides a number of input choices 532, 534, and 536 that a user can select to submit a choice (e.g., a choice of another target device to which to redirect the notification). For example, for the notification UI form 500 related to a VOIP service notification, the input field 530 includes input choices related to the device that the user would like to use for a VOIP session. In one implementation, the selection of input fields 532-536 is based on information about the user that is known to the notification server 506. Thus, if the notification server 506 may know that based on past usage, the user has VOIP applications installed on each of a desktop, a tablet, and a smartphone. Therefore, the notification UI form 500 presents input choices for these three devices. In an alternative implementation, the input field 530 may also be a drop down list, or an input field where the user can manually provide the requested information. Example user input is not limited to keyboard input but may also include without limitation voice responses, still or video image data captured by a mobile camera or other input devices, etc.

In addition, other notification UI forms may collect other user input, such as whether to accept a VOIP call, whether a client "likes" received content, etc. The notification UI form type can vary with the target device, with the destination user, with the type of application service, etc.

A submit button 540 allows the user to save and submit the information provided using the notification UI form 500. In one implementation, the information from the notification UI form 500 is not processed at the device 502 and is sent to the notification server 506 for further processing. Alternatively, an operating system of the device 502 may process the information from the notification UI form 500 to make one or more decisions at the device level. For example, the operating system of the device 502 may invoke a VOIP application on the device 502 in response to the inputs received from the user. The notification server 506 processes the information collected from the notification UI form 500 and communicates with the application server 504 as necessary.

Figure 6:
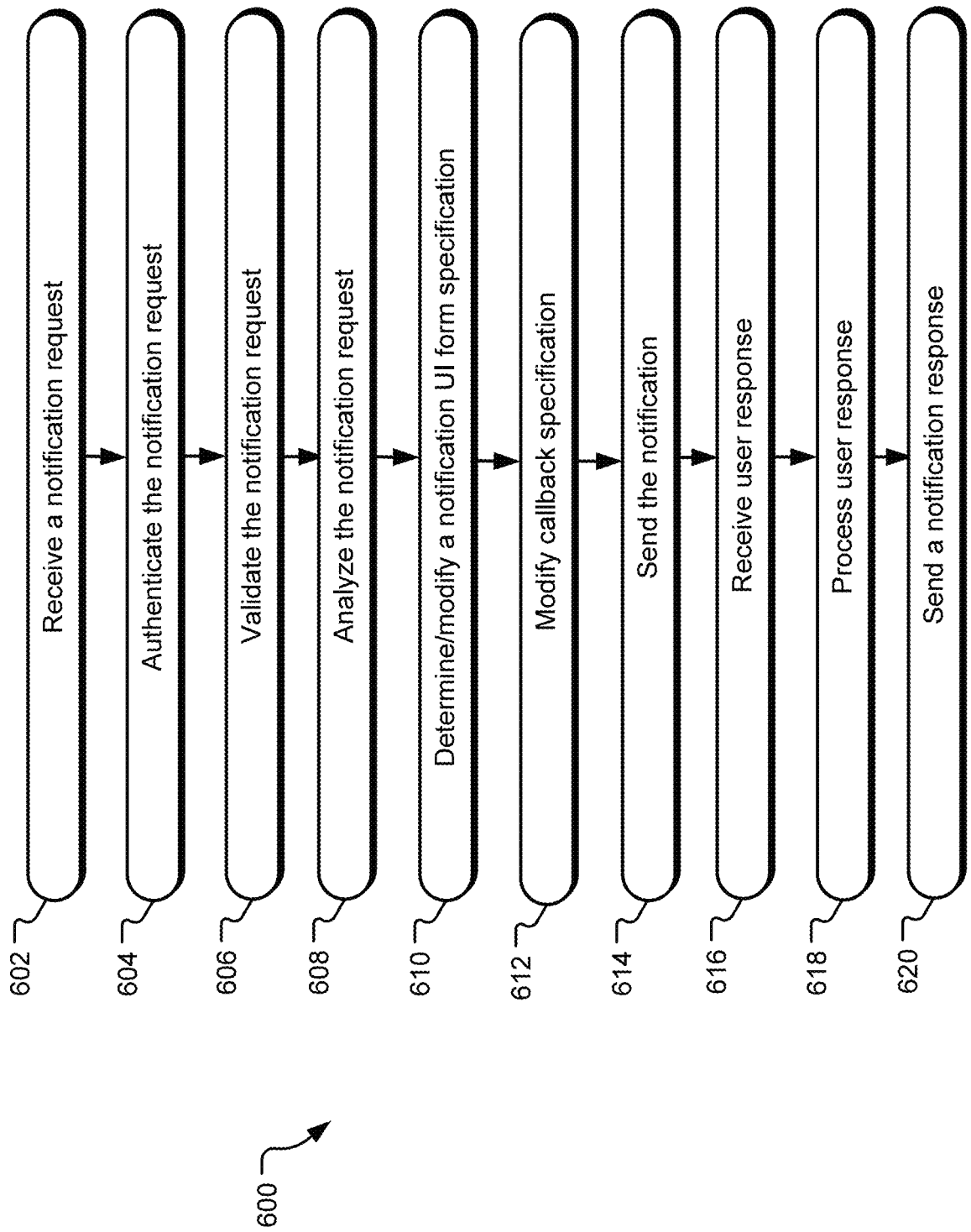
FIG. 6 illustrates example operations of a notification server disclosed herein.

FIG. 6 illustrates example operations 600 of a notification server disclosed herein. A receiving operation 602 receives a notification request from an application server, such as a VOIP service, an IM service, etc. For example, the receiving operation 602 receives the notification request over a secure socket layer (SSL) from an application service. The notification request may include a message to a target user or target device, an identification of the target user or target device, a notification UI form to be sent to the target user or target device, etc. An authenticating operation 604 authenticates the notification request to ensure that the notification request is received from an authenticated application service. A validating operation 606 validates the notification request to ensure that there is no malicious code in the notification request received from the application server.

An analysis operation 608 analyzes the notification request to determine various operations to be taken in response to the notification request. For example, the analysis operation may determine the identity of the target user, the device used by the target user, a communication connection that is used to communicate with the target user, the capabilities of the device used by the target user, etc.

A determining operation 610 determines and/or modifies a notification UI form specification related to the notification request. For example, the determining operation 610 may select a notification UI form specification from a notification UI form database at the notification server. Alternatively, the notification request from the application server may include a notification UI form specification. The determining operation 610 may also modify the selected notification UI form specification associated with the notification request based on various parameters related to the user receiving the notification, the client device used to display the notification, etc. Some examples may include the visual form factor of the client device (e.g., available screen real estate), hardware performance capabilities of the client device, available communication bandwidth, network reliability, etc. For example, the determining operation 610 can change one or more controls, input boxes, etc., to be displayed in a notification UI form based on the type of device used by the user receiving the notification. Thus, if the client device does not include a color display, the notification UI form can be modified to be displayed in grey scale. Alternatively, the determining operation 610 changes the specification for the notification UI form based on the bandwidth of a channel used to communicate with the client device, with a higher resolution notification UI form used for a higher bandwidth channel and a lower resolution notification UI form used for a lower bandwidth channel.

A modifying operation 612 may modify one or more callback specifications from the notification request. Thus, if an application server for VOIP services has sent a notification to the notification server with a callback specification specifying the VOIP service as the callback destination, the modifying operation 612 can modify such callback specification to specify the notification server as the callback destination. For example, the modifying operation 612 may modify callback specification so that the callback destination is a URL/URI identifying the notification server.

A sending operation 614 sends a notification to a target device. The target device is selected based on the information provided in the notification request, information about users stored at the notification server, etc. In one implementation, the notification server has a memory that stores information about communication connections for various client devices. The sending operation 614 selects one of such connections and sends the notification to the client device over the selected connections.

A receiving operation 616 receives user responses from client devices. For example, the receiving operation 616 receives a user response to a notification about a VOIP session request sent to a client device. In one implementation, the user response includes information provided by the user provided through a notification UI form presented to the user along with the notification. In the example where the notification includes a VOIP session request, the user response may include the user's willingness to participate in the VOIP session, an identification of an alternative device used to participate in the VOIP session, an alternate time suggested by the user for the VOIP session, etc.

A processing operation 618 processes the user response to determine an appropriate action. For example, based on the content of the user response, the processing operation 616 may form a notification response that should be sent to the application server that originated the notification request. A sending operation 620 sends the notification response to the application server.

Figure 7:
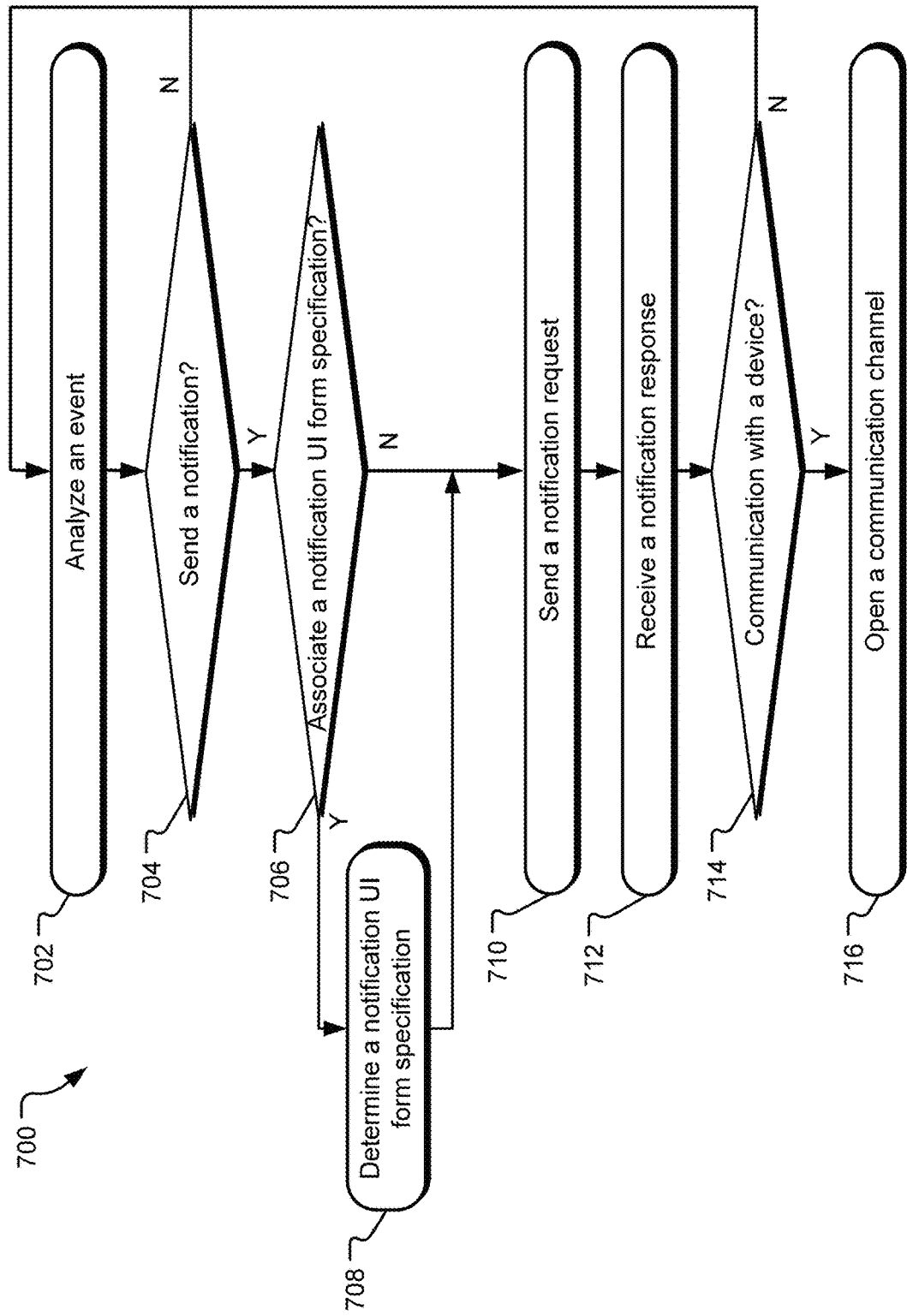
FIG. 7 illustrates example operations of an application server disclosed herein.

FIG. 7 illustrates example operations 700 of an application server disclosed herein. An analysis operation 702 analyzes an event determined by the application service or a related service. For example, if the application server that provides a social networking application service, the analysis operation 702 may analyze a posting by a user on a social networking website. A determining operation 704 determines if the application server needs to send a notification to a user in response to the event. If it is determined that a notification is to be sent, another determination operation 706 determines if a notification UI form specification is to be associated with the notification. If a notification UI form specification is indicated, a selecting operation 708 selects a notification UI form specification from a notification UI form database on the application server and associates the notification UI form specification with a notification to be sent to a target device.

A sending operation 710 sends the notification request to a notification server with or without the notification UI form specification. The notification request may also include other content such as an identification of a user, the content to be displayed to the user, the client device identification, etc. A receiving operation 712 receives a notification response from the notification server. The notification response may include information provided by a user via a notification UI form displayed on a client device. A determining operation 714 processes the notification response to determine whether a communication connection needs to be opened to communicate directly with a client device. If so, a communications operation 716 opens a communication connection for directly communicating with a client device.

Figure 8:
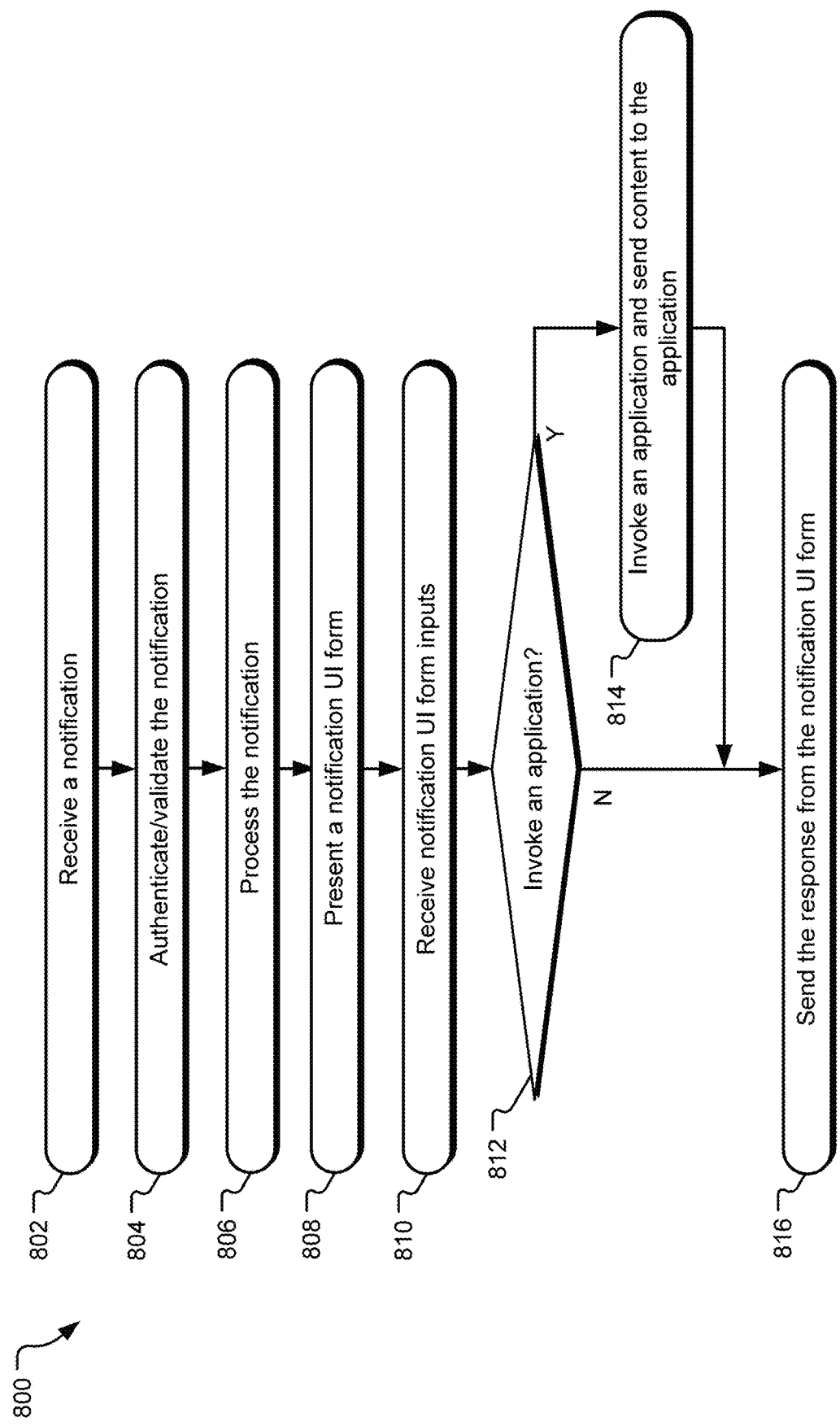
FIG. 8 illustrates example operations of a client device disclosed herein.

FIG. 8 illustrates example operations 800 of a client device disclosed herein. In one implementation, the operations 800 are executed by an operating system of the client device without invoking a related application on the client device. Alternatively, the operating system of the client device may invoke an application on the client device wherein the application executes some of the operations 800.

A receiving operation 802 (e.g., of a client device operating system or of an application at the client device) receives a notification from a notification server. The notification may include, for example, content to be displayed to a user, a notification UI form that is presented to the user, etc. The notification is associated with an application that is installed on the client device. The notification may also be associated with a particular device, a particular user, or a particular hardware or software component on the client device. An authenticating and validating operation 804 authenticates and/or validates the notification to ascertain the source of the notification, the content of the notification, etc. A processing operation 806 (e.g., of a client device operating system or of an application at the client device) processes the notification. Such processing may include determining an application on the client device that the notification pertains to, determining any notification UI form specification associated with the notification, determining any default content that can be used to update the notification UI form specification, etc. For example, if the notification is related to a social networking application and includes a notification UI form specification including input fields for "like," "dislike," etc., the processing operation 806 may select appropriate icons for presenting such input fields.

A presenting operation 808 (e.g., of a client device operating system or of an application at the client device) presents the notification UI form on the client device. An example of the notification UI form includes a message to the user, a logo identifying an application, an input field for free form content from user, an input field providing various options to the user, an input field in the form of a drop-down list, a submit option, etc. A receiving operation 810 (e.g., of a client device operating system or of an application at the client device) receives user inputs via the notification UI form. A determining operation 812 processes the user inputs to determine if an application is to be opened on the client device. If so, an operation 814 (e.g., of a client device operating system or of an application at the client device) opens an application and sends content to the application, wherein the content sent to the application includes content received with the notification, the content received through the notification UI form, etc. A sending operation 816 (e.g., of a client device operating system or of an application at the client device) forms a response and sends the response to the notification server.

Figure 9:
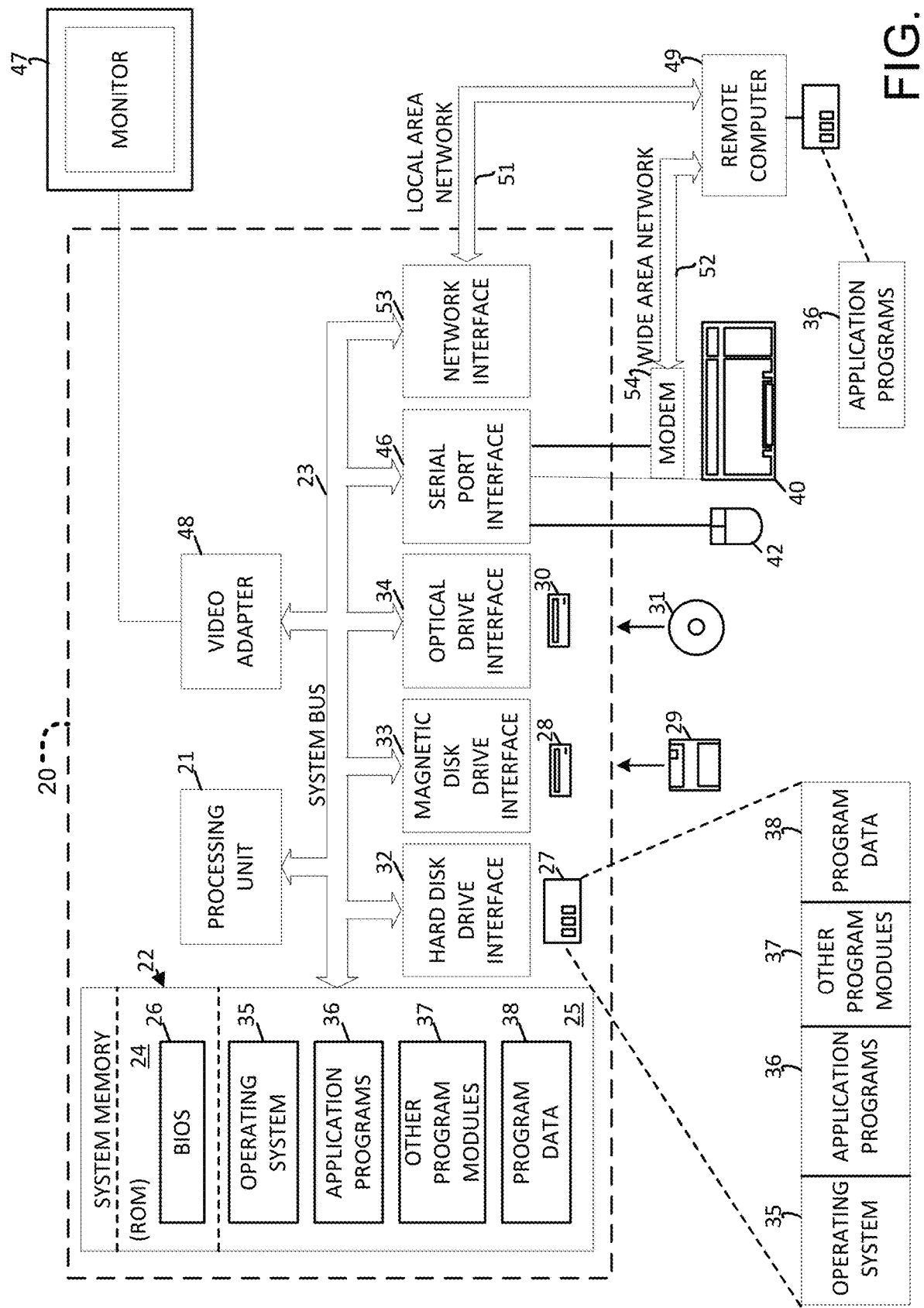
FIG. 9 illustrates an example system that may be useful in implementing the described technology.

FIG. 9 illustrates an example system that may be useful in implementing the described technology. The example hardware and operating environment of FIG. 9 for implementing the described technology includes a computing device, such as general purpose computing device in the form of a gaming console or computer 20, a mobile telephone, a personal data assistant (PDA), a set top box, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a notification server, various application servers, and other engines and services may be embodied by instructions stored in memory 22 and/or storage devices 29 or 31 and processed by the processing unit 21. A user profile, user requests, information about a user's social network, and other data may be stored in memory 22 and/or storage devices 29 or 31 as persistent datastores. Further, a notification server represents hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

The terms "module," "program," "service," and "engine" may be used to describe an aspect of computing system 20 that is implemented to perform one or more particular functions. In some cases, such a module, program, service, or engine may be instantiated via processing unit 21 executing instructions held by system memory 22. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

Figure 10:
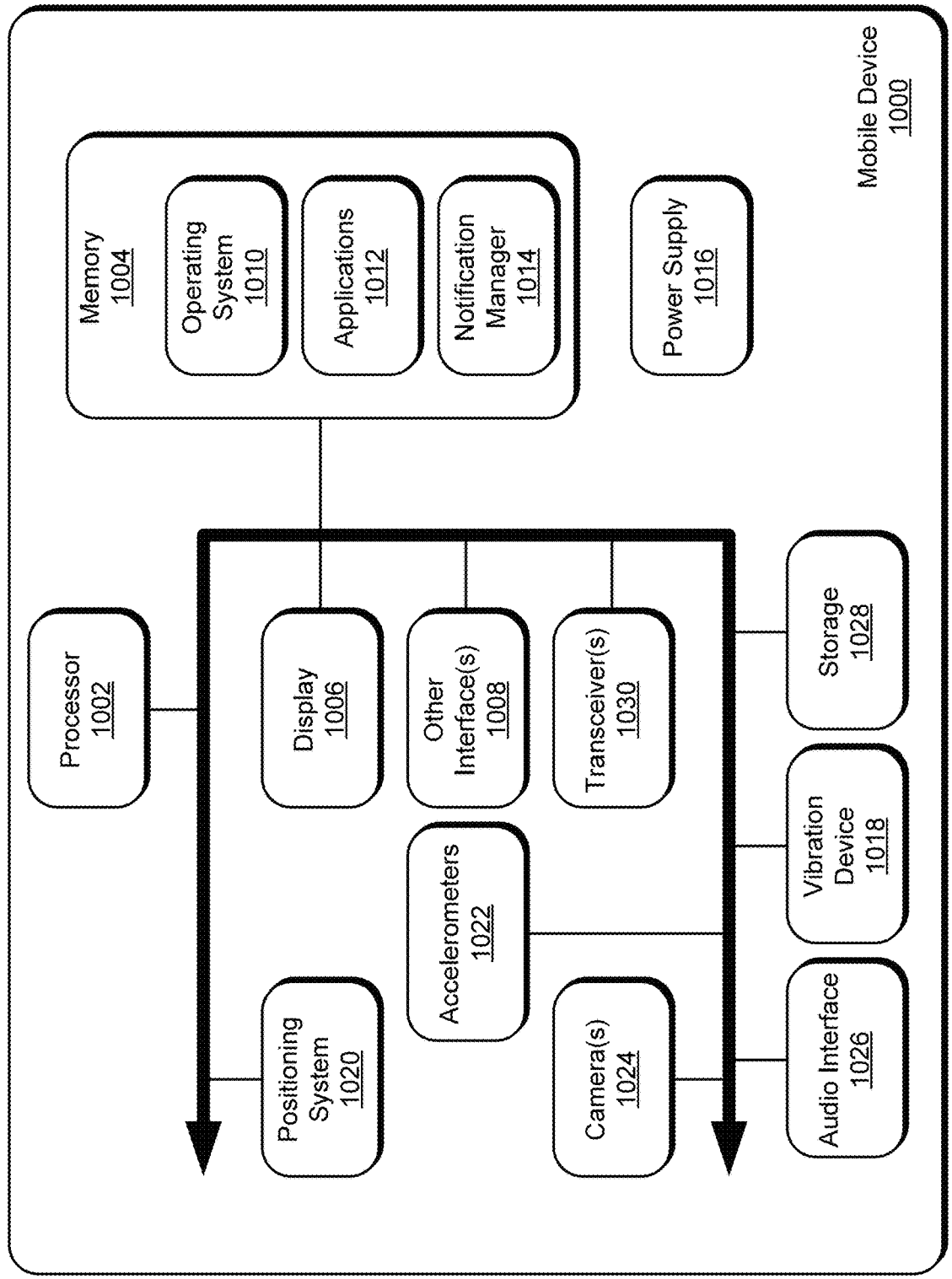
FIG. 10 illustrates another example system that may be useful in implementing the described technology.

FIG. 10 illustrates another example system (labeled as a mobile device 1000) that may be useful in implementing the described technology. The mobile device 1000 includes a processor 1002, a memory 1004, a display 1006 (e.g., a touchscreen display), and other interfaces 1008 (e.g., a keyboard). The memory 1004 generally includes both volatile memory (e.g., RAM) and non-volatile memory (e.g., flash memory). An operating system 1010, such as the Microsoft Windows® Phone operating system, resides in the memory 1004 and is executed by the processor 1002, although it should be understood that other operating systems may be employed.

One or more application programs 1012 are loaded in the memory 1004 and executed on the operating system 1010 by the processor 1002. Examples of applications 1012 include without limitation email programs, scheduling programs, personal information managers, Internet browsing programs, multimedia player applications, etc. A notification manager 1014 is also loaded in the memory 1004 and is executed by the processor 1002 to present notifications to the user. For example, when a promotion is triggered and presented to the shopper, the notification manager 1014 can cause the mobile device 1000 to beep or vibrate (via the vibration device 1018) and display the promotion on the display 1006.

The mobile device 1000 includes a power supply 1016, which is powered by one or more batteries or other power sources and which provides power to other components of the mobile device 1000. The power supply 1016 may also be connected to an external power source that overrides or recharges the built-in batteries or other power sources.

The mobile device 1000 includes one or more communication transceivers 1030 to provide network connectivity (e.g., mobile phone network, Wi-Fi®, BlueTooth®, etc.). The mobile device 1000 also includes various other components, such as a positioning system 1020 (e.g., a global positioning satellite transceiver), one or more accelerometers 1022, one or more cameras 1024, an audio interface 1026 (e.g., a microphone, an audio amplifier and speaker and/or audio jack), and additional storage 1028. Other configurations may also be employed.

In an example implementation, a mobile operating system, various applications, and other modules and services may be embodied by instructions stored in memory 1004 and/or storage devices 1028 and processed by the processing unit 1002. User preferences, service options, and other data may be stored in memory 1004 and/or storage devices 1028 as persistent datastores.

Mobile device 1000 and computer 20 may include a variety of tangible computer-readable storage media and intangible computer-readable communication signals. Tangible computer-readable storage can be embodied by any available media that can be accessed by the mobile device 1000 or the computer 20 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device 1000 or computer 20. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in another embodiment without departing from the recited claims.

What is claimed:

1. A processor-implemented method comprising:
receiving, at a notification server, a notification request from an application server, the application server serving information to a client application installed on a target device, the notification request requesting communication of a notification to the target device and including a notification target identification identifying the target device, the notification request being transmitted from the application server without direct communications between the target device and the application server;
determining a notification UI form specification defining a notification UI form to be displayed on the target device for collecting user input based on the notification target identification; and
communicating, responsive to receipt of the notification request from the application server, a notification associated with the client application installed on the target device, the notification including the determined notification UI form specification and being communicated to the target device for presentation of the notification UI form through a user interface of the target device; and
communicating a user response to the notification to the application server, the application server being specified by a callback specification provided with the notification request.

2. The processor-implemented method of claim 1 wherein the notification request is received by a notification server and further includes a callback specification, the method further comprising:

modifying the callback specification to specify the notification server as a callback destination.

3. The processor-implemented method of claim 1 further comprising:
    determining a notification channel based on the notification target identification; and
    communicating the notification using the notification channel to the target device.

4. The processor-implemented method of claim 1 wherein the determining operation comprises:
    selecting the notification UI form specification based on the notification target identification.

5. The processor-implemented method of claim 1 wherein the determining operation comprises:
    receiving the notification UI form specification from the application server in association with the notification request.

6. The processor-implemented method of claim 1 wherein the determining operation comprises:
    receiving from the application server an identification of the notification UI form specification stored for access by the notification server.

7. The processor-implemented method of claim 1 further comprising modifying the notification UI form specification prior to transmitting the notification including the modified notification UI form specification to the target device.

8. The processor-implemented method of claim 7 wherein modifying the notification UI form specification comprises:
    modifying the notification UI form specification based on a form factor of the target device.

9. The processor-implemented method of claim 1 further comprising receiving form information collected by the notification UI form presented via the user interface of the target device.

10. The processor-implemented method of claim 9 further comprising:
    processing the form information to determine a user response.

11. The processor-implemented method of claim 1 wherein the notification includes one or more instructions to the target device to process the notification using an operating system of the target device.

12. The processor-implemented method of claim 1 wherein the notification includes one or more instructions to the target device to process the notification without opening an application on the target device.

13. The processor-implemented method of claim 1 wherein the notification UI form allows a user to specify an alternative device at which to receive the notification.

14. The processor-implemented method of claim 1 further comprising:
    preparing user interface components associated with the notification UI form in accordance with the target device; and
    transmitting the prepared user interface components to the target device separately from the notification UI form.

15. A communications-network-connected system comprising:
    a communication device communicatively coupled to an application server interface adapted to serve information to a client application installed on a target device, the communication device being adapted to receive, from the application server interface, a notification request that requests communication of a notification to the target device and that includes a notification target identification from an application server, the notification target identification identifying the target device, the notification request being transmitted by the application server without direct communications between the target device and the application server;
    one or more processing units for executing a determination module configured to determine a notification UI form specification defining a notification UI form to be displayed on the target device for collecting user input based on the notification target identification;
    the one or more processing units further for executing a communication module configured to:
        communicate, responsive to receiving the notification request from the application server, a notification associated with the client application installed on the target device, the notification including the determined notification UI form specification and being communicated to the target device for presentation of the notification UI form through a user interface of the target device, the notification UI form having at least one of: a comment field and a plurality of input choice buttons for user selection from among a plurality of choices; and
        communicate a user response to the notification back to the application server, the application server being specified by a callback specification provided with the notification request.

16. One or more computer-readable storage media of a tangible article of manufacture storing computer executable instructions for performing a computer process on a computing system, the computer process comprising:
    receiving a notification request from an application server, the application server serving information to a client application installed on a target device, the notification request requesting communication of a notification to the target device and including a notification target identification, identifying the target device, the notification request being transmitted from the application server without direct communications between the target device and the application server;
    determining a notification UI form specification defining a notification UI form to be displayed on the target device for collecting user input based on the notification target identification;
    communicating, responsive to receipt of the notification request from the application server, a notification associated with the client application installed on the target device, the notification including the determined notification UI form specification and being communicated to the target device for presentation of the notification UI form through a user interface of the target device; and
    communicating a user response to the notification to the application server, the application server being specified by a callback specification provided with the notification request.

17. The one or more tangible computer-readable storage media of claim 16 wherein the determining operation comprises:
    selecting the notification UI form specification based on the notification target identification.

18. The one or more tangible computer-readable storage media of claim 16 wherein the determining operation comprises:
    receiving the notification UI form specification from the application server in association with the notification request.

19. The one or more tangible computer-readable storage media of claim 16 wherein the determining operation comprises:
   receiving from the application server an identification of the notification UI form specification stored for access by the notification server.

20. The one or more tangible computer-readable storage media of claim 16 wherein the determining operation comprises:
   modifying the notification UI form specification prior to transmitting the notification including the modified notification UI form specification to the target device.

21. The processor-implemented method of claim 1 wherein the user input is collected on the target device responsive to the notification.

22. The processor-implemented method of claim 21 wherein the user input collected on the target device is communicated to the application server via the notification server.

23. The processor-implemented method of claim 1 wherein the notification UI form specification defining the notification UI form is determined at the notification server and the notification including the determined notification UI form specification is communicated from the notification server to the target device responsive to the receipt of the notification request from the application server.

* * * * *